Dec. 23, 1930.  W. B. SCHULTE  1,785,981
BATTERY
Filed May 28, 1929  2 Sheets-Sheet 1
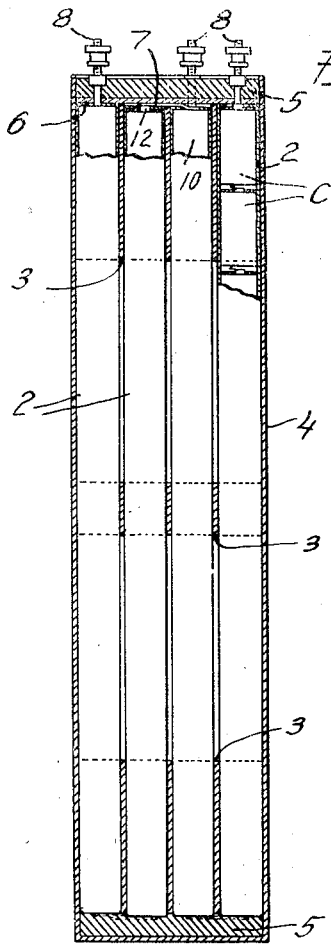
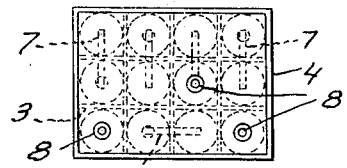
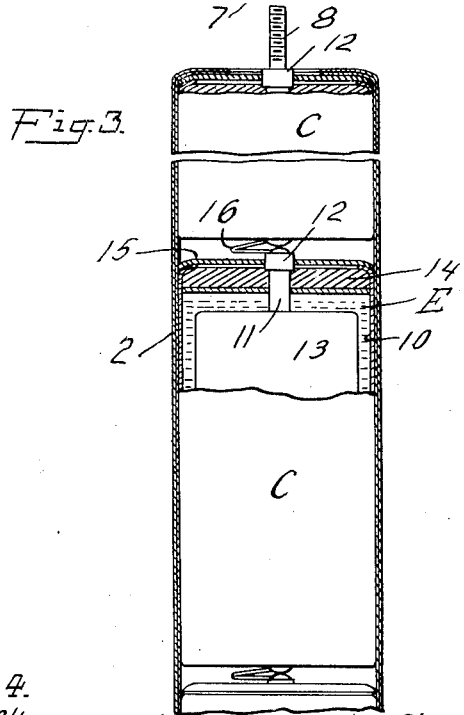
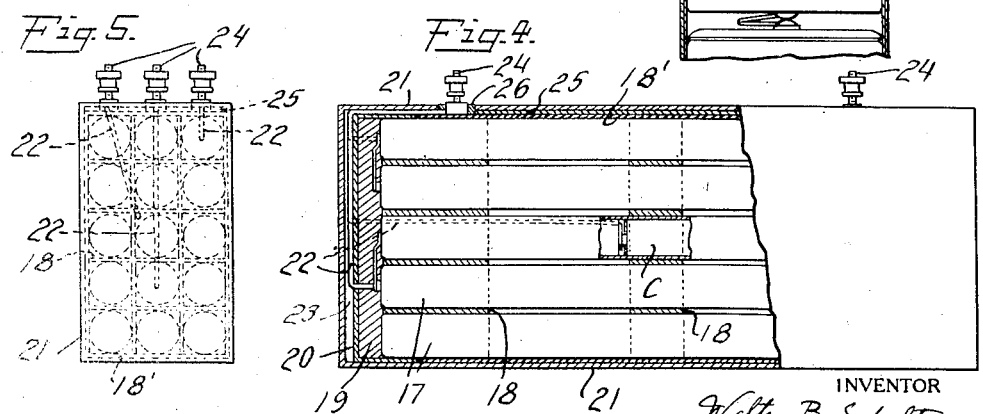
INVENTOR
Walter B. Schulte
BY
Pennie, Davis, Marvin & Edmonds
HIS ATTORNEYS Dec. 23, 1930.  W. B. SCHULTE  1,785,981
BATTERY
Filed May 28, 1928    2 Sheets-Sheet 2
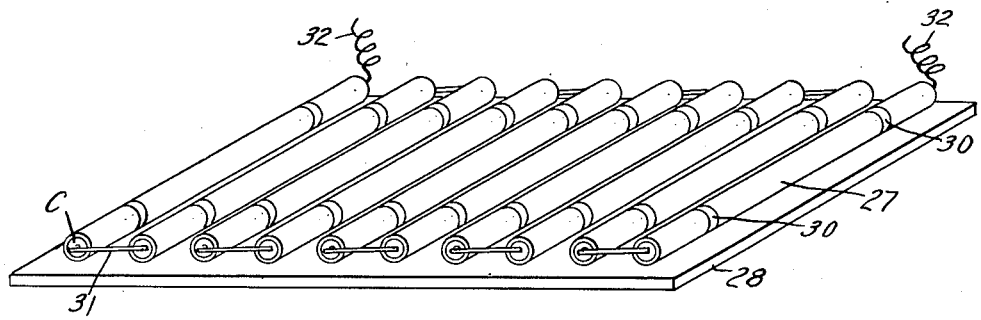
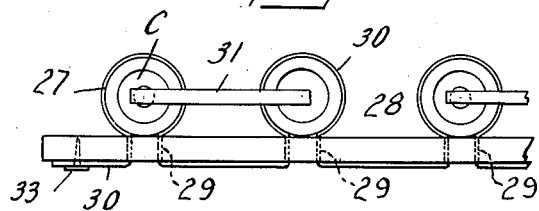 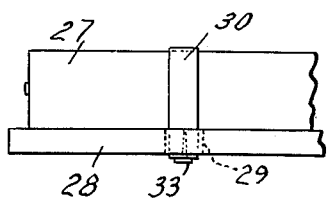
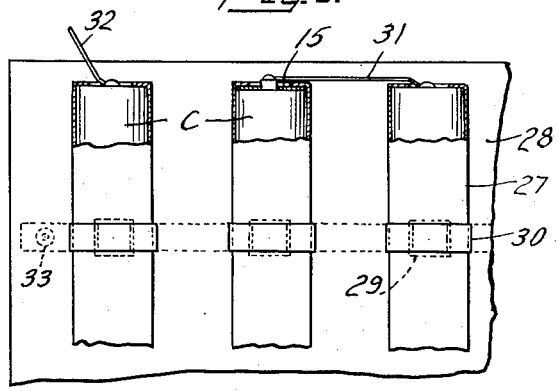
INVENTOR
Walter B. Schulte
BY
Pennie, Davis, Marvin & Edmonds
HIS ATTORNEYS Patented Dec. 23, 1930

1,785,981

UNITED STATES PATENT OFFICE

WALTER B. SCHULTE, OF MADISON, WISCONSIN, ASSIGNOR TO BURGESS BATTERY COMPANY, A CORPORATION OF WISCONSIN

BATTERY

Application filed May 28, 1928. Serial No. 281,007.

This invention relates to batteries and more particularly concerns multi-cellular high voltage dry batteries for use in connection with the plate circuits of vacuum tubes and for various other purposes.

With the rapid development and wide spread use of radio communication, particularly in the fields of aviation and in military and naval service, it has become necessary to provide a compact source of uni-directional potential for energizing the plate circuits of the audions and other vacuum tubes employed in radio sending and receiving apparatus. Thus, in portable radio receiving and sending sets for use in airplanes, submarines, small water craft, field signalling work and other applications where a minimum space is available and where light weight is essential, the source of plate circuit voltage should be not only light and compact, but should be so shaped and arranged as to conveniently occupy out-of-the-way spaces which ordinarily serve no useful purpose.

It is further essential that plate or "B" batteries for the uses generally indicated be designed to give maximum dependability even under adverse operating conditions, and accordingly, such batteries should be characterized by resistance to moisture, temperature changes and other atmospheric conditions.

With the above and other considerations in mind, it is proposed in accordance with the present invention to provide a multi-cell high voltage "B" battery of compact and convenient size, light weight and maximum dependability. It is a further object of the present invention, to provide a battery of this type which may be readily altered as to size and shape, and which may be easily repaired upon the failure of certain portions thereof.

According to the present invention, the cells of the battery are arranged in end-to-end relation in long tubes to form cylindrical or candle shape units. These tubes are preferably arranged side by side in parallel relation. By varying the number of cells in each tube or by varying the arrangement and number of the tubes, a battery of any desired dimensions may be produced. The tubes are preferably formed of several layers of a tough heavy grade of paper, such as "kraft" paper, and by impregnating this paper with asphalt, a liquid repellent lateral wrapper is provided for the cells. Heavy paraffin impregnated washers are preferably interposed between the ends of the cells providing liquid repellent end enclosures therefor, as will be hereinafter more fully explained. This construction reduces to a minimum the probability of short circuits caused by the leakage of the electrolyte from the cells. Spacing members are preferably provided between the adjacent tubes of the battery, and are preferably arranged in longitudinally spaced relation in order that an air insulation space is provided between the parallel tubes or units.

Various other specific objects, advantages and characteristic features of the present invention, will be pointed out or will become apparent as the description thereof progresses.

In describing the invention in detail, reference will be made to the accompanying drawings, in which:

Figure 1 is a sectional side view of a battery embodying the present invention;

Fig. 2 is a plan view of the battery shown in Fig. 1;

Fig. 3 is a sectional view of a portion of one of the battery units constructed in accordance with the present invention, certain elements thereof being broken away to show the interior construction;

Fig. 4 is a side view, partly in section, of a modified form of the present invention;

Fig. 5 is an end view of the battery shown in Fig. 4;

Fig. 6 is a perspective view of a further modified form of the present invention; and Figs. 7, 8 and 9 are respectively end, side and plan views of portions of the battery shown in Fig. 6.

Referring to the drawings, the battery shown in Fig. 1 comprises a plurality of cells C arranged in end-to-end relation within a plurality of long tubes 2 of water repellent, electrical insulating material, such as asphalt impregnated "kraft" paper. The tubes 2 are arranged in parallel relation, and are held in place and spaced from each other by a plurality of nesting partitions 3 comprising a plurality of interlocked strips of insulating, water repellent material such as bakelite or paraffin impregnated paper. The grouped tubes 2 are enclosed within a carton 4 of impregnated paper or cardboard, and the nesting partitions or spacers 3 are preferably arranged at the upper and lower ends of this carton and at the mid-point thereof, as clearly shown. The partitions 3 may be replaced by narrow strips extending transversely of the carton between the tubes 2 if desired.

The upper and lower ends of the carton 4 are preferably sealed with a layer of fusible sealing material 5. The ends of the cylindrical battery units 2, as well as the ends of the nesting partitions 3 may be embedded in this sealing material if desired, but in certain cases, it is preferred to provide a water repellent spacing sheet 6 of paraffin impregnated paper or similar material between the sealing material 5 and the ends of the units 2, as illustrated at the top of the battery shown in Fig. 1. The cells C and the units 2 are preferably electrically connected in series as will be more fully described hereinafter, and a plurality of terminals 8 are embedded in the sealing material 5 or otherwise suitably secured at the top of the battery and are connected to the end cells and at certain intermediate points therein as may be desired.

Referring now more particularly to the construction and arrangement of the cylindrical or candle shaped units employed in assembling batteries in accordance with the present invention, an enlarged section of one of these units has been shown in Fig. 3. The tube 2 of the unit preferably comprises a plurality of layers of impregnated material rolled into a cylinder having an inside diameter substantially equal to the outside diameter of the cells to be used therein. The cells C are of the small cylindrical type comprising a zinc can or cup 10, a carbon rod 11, axially disposed within the cup 10 and provided with a brass cap 12 at the upper end thereof, and a depolarizing mix cake 13 within the cell, surrounding the rod 11. The mix cake 13 is surrounded by a gelatinous or semi-liquid electrolyte E, and the top of the zinc can 10 is closed by a layer 14 of fusible sealing material. The upper edge of the zinc can 10 is preferably crimped down over the upper surface of the sealing material 14. A washer 15 of water repellent material, such as paraffin impregnated paper, is fitted over the end cap 12 on the carbon rod 11 of each cell C, this washer extending over the entire upper end of the cell and engaging the inner wall of the tube 2. The diameter of the washers 15 is slightly greater than the inside diameter of the tube 2, to insure a tight fit between these elements as hereinafter more fully explained. The successive cells C in each unit are electrically connected by a short piece of soft conducting wire 16; the opposite ends of which are soldered respectively to the caps 12 and the lower ends of the zinc cups 10 of the successive cells C.

In assembling a battery unit in accordance with the present invention, the flexible washers 15 are fitted over the end caps 12 of the carbon electrodes 11 of a plurality of cells C. These cells are then arranged in end-to-end relation, and the connector wires 16 are soldered between the cap 12 of each cell and the lower end of the can 10 of each adjacent cell. The number of cells thus interconnected is varied in accordance with the size of unit desired. The cells are then inserted in the tube 2 with their carbon rod ends foremost, and are pressed therein until substantially the entire length of the tube is filled with the cells C. The washers 15 being of greater diameter than the inside diameter of the tube 2, are crimped down around the rounded upper edges of the cell C to form a very close fit over the top of each cell as clearly shown in Fig. 3. This close fit between the washers 15, the upper ends of the cells C and the inner walls of the tube 2 minimizes the probability of the leakage of electrolyte into the space between the cells with the resultant establishment of short circuits in the battery. The ends of the tube 2 preferably extend beyond the ends of the end cells therein, and are folded inwardly over the cells as shown in the drawings.

When the preformed units are assembled within the carton 4, alternate units are preferably inverted or oppositely oriented so that they may be connected in series by suitable conductors 7 extending across the ends thereof as shown in Figs. 1 and 2. The binding posts 8 are preferably soldered directly to the end caps 12 or the bases of the zinc cans 10 of end cells of the assembled units Certain of the binding posts 8 are preferably connected to the cells of intermediate units of the battery whereby variable voltage taps are provided. These connections may be made through insulated wires or in any other suitable manner.

In the modified form of the invention shown in Figs. 4 and 5, a battery of different shape and terminal arrangement has been disclosed. In this modification, the battery units 17 are fitted into nesting partitions 18 placed at the ends and at the midpoint of a suitable carton 21 as shown. If desired, the units 17 may be laterally wrapped in a waxed paper cover 18' before being inserted within the carton. The ends of the unit 17 are embedded in layers of sealing material 19 which is contained in a tray of water repellent sheet material 20, the carton 21 surrounding the units 17 and the trays as clearly shown. The terminals 24 may be arranged at any convenient point, and are shown located on the side of the carton 21, being connected to the battery cells by suitable insulated conductors 22 extending through a space 23 between the tray 20 and the end wall of the carton 21. Certain of the conductors 22 may be connected to intermediate cells within the units 17 to provide variable voltage taps at any desired point in the battery. A lining sheet 25 is preferably located at the top of the battery, and is provided with a plurality of slots in its end portions for the reception of the lead wires 22. The carton 21 as well as the lining sheet 25 are cut away around the binding posts 24, and a layer of fusible sealing material 26 is poured into the spaces provided by these cut away portions, thereby sealing the binding posts to the carton.

A further modified form of battery constructed in accordance with the present invention has been illustrated in Figs. 6 through 9. This battery comprises generally a board or sheet 28 formed of a suitable insulating material and having a plurality of battery units 27 secured thereto in parallel relation. The board 28 is provided with two parallel rows of equally spaced openings 29, these rows being spaced from the edges of the board and from each other. The units 27 are placed upon the boards 28 in such a manner that each unit overlies one of the holes 29 in each row, the holes being adjacent points near the ends of the units. A suitable strip of fabric, cord or other flexible material 30 is passed through each of the openings 29 and encircles each of the battery units 27, as clearly illustrated in Fig. 7. The retaining strip 30 is suitably secured to the lower face of the board 28 by suitable means such as tacks or screws 33. The adjacent units 27 on the board 28 are preferably oppositely disposed and are connected in series by means of suitable conductors 31 soldered to the adjacent ends thereof as clearly shown. Intermediate voltage taps may be provided by soldering conductors to either the connectors 31 or to the intermediate cells within the units 27. Conductor leads 32 are provided on the end units, to provide terminals for the battery.

A particular feature of the battery of the present invention resides in the fact that it may be easily repaired in case of failure from a defect in one portion thereof. Defects usually develop within a cell of a battery, or result from the breakage of conductors between cells, units or terminals. High voltage batteries of the type described are usually employed under conditions requiring dependable operation and a failure of such batteries is therefore a serious problem. In the battery of the present invention, if a failure occurs, the ends of the cylindrical units may be exposed by cutting away the carton near the ends thereof, the defective unit may be located by testing the various units, and the connections between the units may be changed so as to remove the defective unit from the battery circuit. If desired, the defective unit may be withdrawn from the battery and replaced by a new unit, thus maintaining the battery at its original strength. Since the failure of a battery of this type is usually confined to one cell or unit thereof, the remaining units being in comparatively good condition, the ease with which the units may be withdrawn and replaced results in considerable economy in the use of these batteries, the defective part rather than the entire battery being discarded.

From the description given, it will be apparent that a battery constructed in accordance with the present invention embodies many advantageous features. The cylindrical units may be arranged to form a battery of any desired shape and which will occupy small out-of-the-way places where other apparatus could not be conveniently disposed. Thus the battery in the form shown in Fig. 6 can be hung against a vertical wall or partition, the batteries of Figs. 1 through 5 can be slipped into long narrow spaces, and, in general, the units may be arranged to occupy whatever waste space may be available.

The battery of the form disclosed in Figs. 6 through 9, is particularly adapted for the detection of defects and the removal or replacement of defective units. In this form, it is merely necessary to test the various units 27, remove the defective unit and slip a new one in its place, replacing the end connectors to include the new unit in the battery circuit.

Although the present invention has been described in connection with certain specific embodiments, it should be understood that the invention is not limited to the exact constructions or arrangements shown, but that certain variations both in structure and arrangement may be made without departing from the scope of the invention as defined by the appended claims.

I claim:

1. A high voltage dry battery comprising a carton, a plurality of elongated cylindrical battery units disposed in parallel relation within said carton, each of said units comprising a plurality of electrically connected cells, means for electrically connecting said units in series whereby a considerable difference in voltage exists between adjacent units and means comprising a plurality of strips of liquid-repellent insulating material extending between said units and maintaining said units in spaced relation.

2. In a high voltage dry battery, a carton, a plurality of cylindrical battery units within said carton, each of said units comprising a plurality of electrically connected cells arranged in end-to-end relation within a cylindrical tube of water repellent insulating material, means for electrically connecting said units in series whereby a considerable difference in voltage exists between adjacent units and a plurality of spacing strips of water repellent insulating material disposed between said battery units at longitudinally spaced points along the cylindrical surfaces thereof.

3. In a high voltage dry battery, a carton, a plurality of cylindrical battery units disposed in parallel relation within said carton, means for electrically connecting said units in series whereby a considerable difference in voltage exists between adjacent units and spacing means extending between the end portions and the mid-portions of said battery units, each of said means comprising a plurality of angularly disposed strips of water repellent insulating material, whereby air insulating spaces are provided between said battery units.

4. A dry battery comprising a carton, a plurality of cylindrical battery units disposed in parallel relation within said carton, each of said units comprising a plurality of electrically connected dry cells arranged in end-to-end relation within a tube of water repellent insulating material, means for electrically connecting at least some of said battery units, a plurality of strips of insulating material between said battery units for maintaining said units in spaced relation, a sheet of water repellent insulating material covering the ends of said units adjacent at least one end of said carton, a mass of fusible sealing material at one end of said carton, a plurality of binding posts embedded in said sealing material, and means for electrically connecting said binding posts to said battery units.

5. A cylindrical battery unit comprising a plurality of cylindrical dry cells arranged in end-to-end relation, means for electrically connecting said dry cells in series, insulating washers disposed between adjacent cells, and a tube of water repellent insulating material surrounding said cells.

6. A cylindrical battery unit comprising a plurality of cylindrical dry cells arranged in end-to-end relation, means for electrically connecting said dry cells in series, a tube of water repellent insulating material surrounding said cells, and insulating washers disposed between the adjacent cells and engaging the interior walls of said tube.

7. A cylindrical battery unit comprising a plurality of cylindrical dry cells arranged in cylindrically aligned relation, current conducting means permanently secured between the opposite poles of adjacent cells, and a single tube of water repellent insulating material having a uniform diameter throughout its length surrounding all of said cells.

8. A cylindrical dry battery unit comprising a plurality of cylindrical dry cells arranged in cylindrically aligned relation, a tube of water repellent material surrounding said cells, a flexible disk of insulating material of larger diameter than the internal diameter of said tube disposed between each adjacent pair of cells, and means passing through said disks for electrically connecting said cells.

9. A cylindrical battery unit comprising a plurality of dry cells arranged in cylindrically aligned relation, each of said cells having a central electrode protruding from one end thereof, a flexible washer of insulating material between each pair of adjacent cells, said washer surrounding the protruding electrode of one cell and extending beyond the cylindrical surface thereof and a cylindrical tube of insulating material surrounding said cells and engaging said washers, the ends of said tube extending inwardly over the end cells of said unit.

10. The method of assembling a cylindrical battery unit which comprises placing flexible washers over one end of each of a plurality of cylindrical cells, arranging the cells in cylindrical alignment, electrically connecting said cells in series and inserting said cells with said washers foremost into a cylindrical tube of smaller inside diameter than the outside diameter of said washers.

11. The method of assembling a cylindrical battery unit which consists in placing a washer over the central carbon electrode of each of a plurality of dry cells, arranging said cells in cylindrically aligned relation, electrically connecting said cells in series, inserting said cells with said washers foremost into a cylindrical tube, and folding the ends of said tube over the end cells therein.

12. The method of assembling a cylindrical battery unit which comprises placing flexible washers over the central carbon electrodes of a plurality of cylindrical dry cells, soldering electric conducting means between the central electrode of each cell and the can of each adjacent cell, arranging said cells in cylindrically aligned relation, and pushing said aligned cells, carbon electrode end foremost, into a cylindrical tube.

13. A cylindrical battery unit comprising a plurality of serially connected cylindrical dry cells arranged in cylindrically aligned relation, each of said cells having a central electrode protruding from one end thereof, and including a metallic can having the upper edge thereof continuously inwardly crimped, a flexible washer of insulating material between each pair of adjacent cells, said washer surrounding the protruding electrode of one cell and extending beyond the cylindrical surface of said cell and fitting snugly against the crimped edge of the can thereof, and a cylindrical tube of insulating material surrounding said cells and engaging said washers, the ends of said tube extending inwardly over the end cells of said unit.

In testimony whereof I affix my signature.

WALTER B. SCHULTE.